United States Patent
Dai et al.

(10) Patent No.: US 9,685,103 B2
(45) Date of Patent: Jun. 20, 2017

(54) DOOR WITH BUILT-IN EXIT SIGNAL

(71) Applicant: HON HAI PRECISION INDUSTRY CO., LTD., New Taipei (TW)

(72) Inventors: Feng-Yuen Dai, New Taipei (TW); Chau-Jin Hu, New Taipei (TW); Yung-Lun Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 43 days.

(21) Appl. No.: 14/824,801

(22) Filed: Aug. 12, 2015

(65) Prior Publication Data

US 2016/0312524 A1  Oct. 27, 2016

(30) Foreign Application Priority Data

Apr. 23, 2015  (TW) .............................. 104112986 A

(51) Int. Cl.
| | |
|---|---|
| *G09F 19/22* | (2006.01) |
| *E06B 3/46* | (2006.01) |
| *G09F 13/04* | (2006.01) |
| *E06B 3/02* | (2006.01) |
| *E06B 7/28* | (2006.01) |
| *G09F 19/04* | (2006.01) |
| *G02B 6/00* | (2006.01) |

(52) U.S. Cl.
CPC .............. *G09F 19/22* (2013.01); *E06B 3/02* (2013.01); *E06B 3/4636* (2013.01); *E06B 7/28* (2013.01); *G09F 13/04* (2013.01); *G09F 19/04* (2013.01); *G02B 6/00* (2013.01); *G09F 2013/045* (2013.01); *G09F 2013/0459* (2013.01)

(58) Field of Classification Search
CPC .... G09F 19/22; G09F 13/04; G09F 2013/045; G09F 2013/0459; G09F 2013/049; A06B 3/02; E06B 3/4636
See application file for complete search history.

(56) References Cited

U.S. PATENT DOCUMENTS

| | | | | |
|---|---|---|---|---|
| 1,451,877 | A * | 4/1923 | Koehler ................. | G09F 13/34 40/459 |
| 2,752,708 | A * | 7/1956 | Sundquist .............. | G09F 7/06 40/580 |
| 4,872,095 | A * | 10/1989 | Dubak ................ | F21V 33/0016 362/100 |
| 5,581,230 | A * | 12/1996 | Barrett .................... | G08B 5/36 116/202 |
| 6,058,635 | A * | 5/2000 | Morris ................... | G09F 13/04 40/544 |
| 6,736,534 | B1 * | 5/2004 | Fite .......................... | E06B 7/30 362/145 |
| 7,125,136 | B1 * | 10/2006 | Dedic ..................... | E06B 1/52 362/152 |
| 9,163,428 | B1 * | 10/2015 | Fare ....................... | E05B 17/10 |

(Continued)

*Primary Examiner* — Gary Hoge
(74) *Attorney, Agent, or Firm* — Steven Reiss

(57) ABSTRACT

A door with an "EXIT" signal which operates automatically includes a door panel and a light source. The door panel includes a first plate. The first plate includes a front surface. The front surface defines a plurality of pits. The pits form a predetermined pattern, in the shape of a word. The light source is fixed above the first plate. The light source emits light to toward the pits to illuminate the predetermined pattern in the shape of a word when the door is in a closed state.

5 Claims, 5 Drawing Sheets

(56) References Cited

U.S. PATENT DOCUMENTS

| | | | | |
|---|---|---|---|---|
| 2005/0262772 | A1* | 12/2005 | Zimmerman | E05B 65/0888 49/449 |
| 2009/0059602 | A1* | 3/2009 | Santos | G08B 7/06 362/351 |
| 2010/0139638 | A1* | 6/2010 | Hargrave | F24C 15/008 126/19 R |
| 2011/0119972 | A1* | 5/2011 | Kay | G09F 13/20 40/541 |
| 2011/0226996 | A1* | 9/2011 | Postma | C09D 5/22 252/301.36 |
| 2013/0145693 | A1* | 6/2013 | Li | G09F 13/20 49/70 |

* cited by examiner

DOOR WITH BUILT-IN EXIT SIGNAL

CROSS-REFERENCE TO RELATED APPLICATIONS

This application claims priority to Taiwan Patent Application No. 104112986, filed on Apr. 23, 2015 the contents of which are incorporated by reference herein.

FIELD

The subject matter herein generally relates to building construction.

BACKGROUND

Instructions of emergency exit are installed near exits of buildings. The instruction of emergency exit includes a light source, a shell, an acrylic plate, and an opaque green tape. The structure of the exit signal is complex.

BRIEF DESCRIPTION OF THE DRAWINGS

Implementations of the present technology will now be described, by way of example only, with reference to the attached figures.

DETAILED DESCRIPTION

Figure 1:
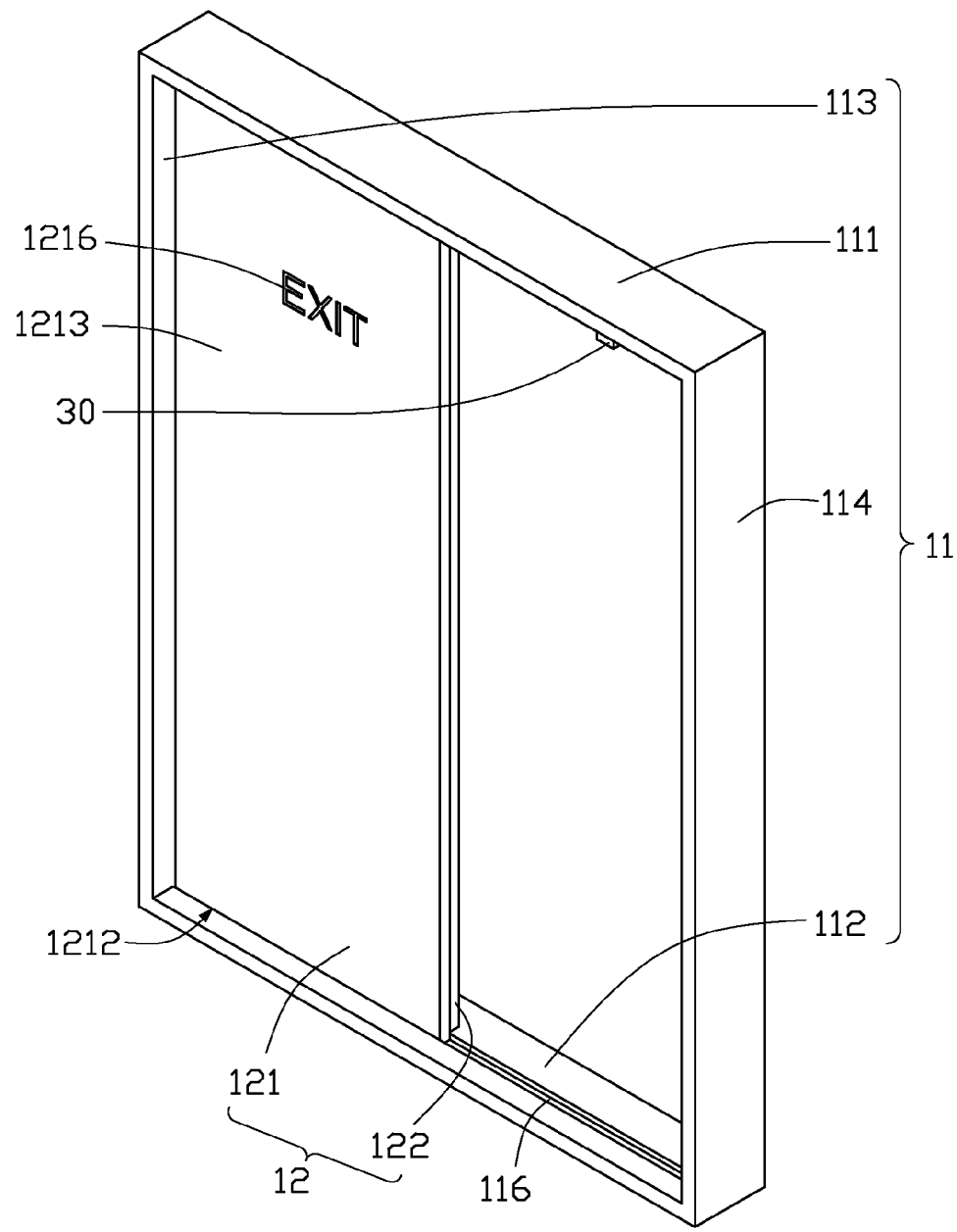
FIG. 1 is an isometric view of a door with an exit signal in an open state.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "comprising" means "including, but not necessarily limited to"; it specifically indicates open-ended inclusion or membership in a so-described combination, group, series, and the like.

Figure 2:
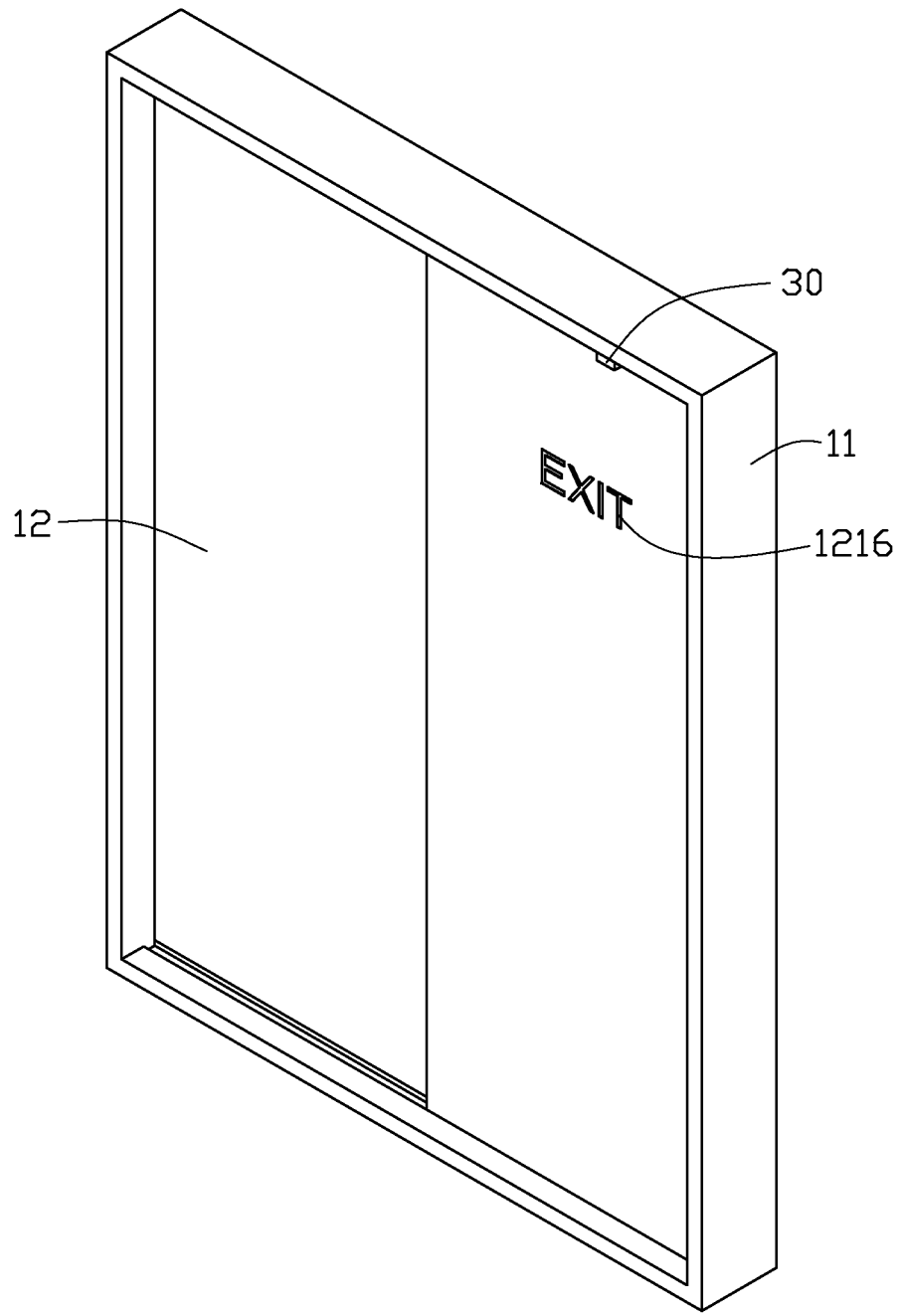
FIG. 2 is an isometric view of the door of FIG. 1 with exit signal in a closed state.

FIGS. 1 and 2 illustrate a door 10 includes a door frame 11, a door panel 12, and a light source 30. The door frame 11 includes a top rim 111, a bottom rim 112, a first lateral rim 113, and a second lateral rim 114. The top rim 111 is opposite to the bottom rim 112. The first lateral rim 113 and the second lateral rim 114 are connected between the top rim 111 and the bottom rim 112. The top rim 111 and the bottom rim 112 are configured to be fixed within walls. The bottom rim 112 is configured to be fixed to a floor. A first guiding groove 116 is defined at a side of the bottom rim 112 opposite to the top rim 111. A second guiding groove (not shown) is defined at a side of the top rim 111 opposite to the bottom rim 112.

The door panel 12 includes a first plate 121 and a second plate 122. The first plate 121 is parallel to the second plate 122. The first plate 121 and the second plate 122 are positioned between the top rim 111 and the bottom rim 112. Two opposite ends of the first plate 121 are slidably received in the first guiding groove 116 and the second guiding groove. The second plate is fixed to the top rim 111, the bottom rim 112, and the first lateral rim 113. The first plate 121 is slidable between the first lateral rim 113 and the second lateral rim 114. The first plate 121 can overlap the second plate 122, the door 10 then being in an opened state. When the first plate 121 slides to touch the second lateral rim 114, the first plate 121 spreads with the second plate, and the door 10 is then in a closed state. The first plate 121 and the second plate 122 are made of translucent glass.

Figure 3:
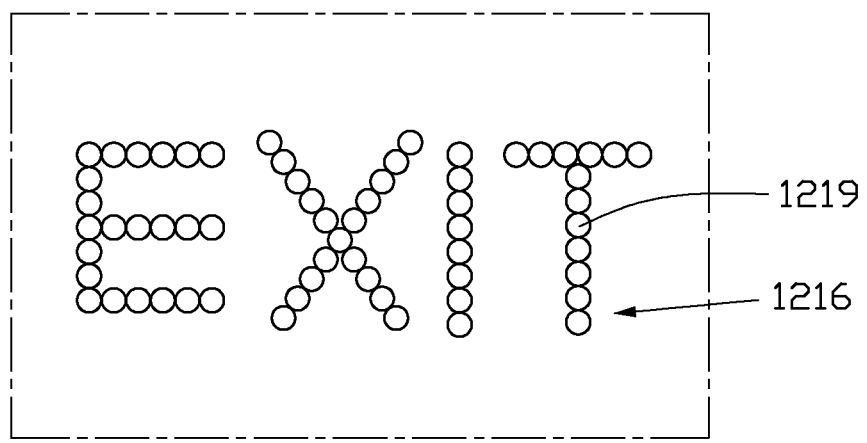
FIG. 3 is an enlarged view of a predetermined pattern of the door of FIG. 1
Figure 4:
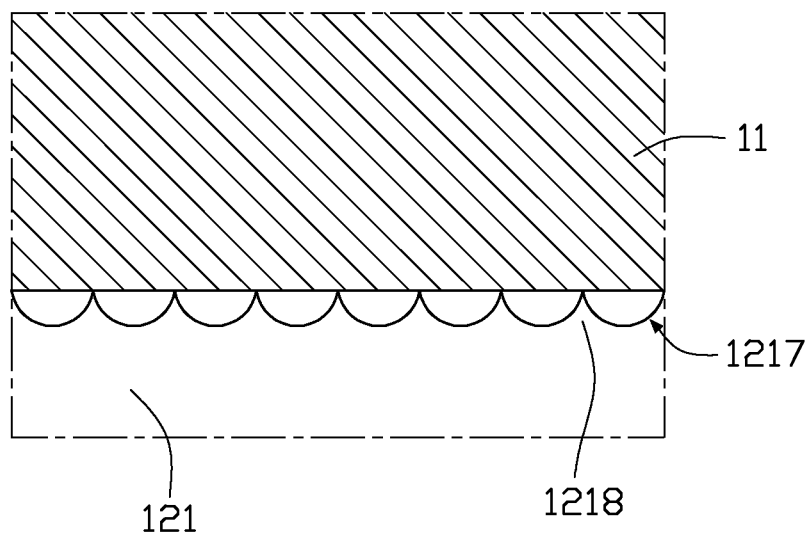
FIG. 4 is an enlarged view of a top surface of a first plate of the door of FIG. 1.

The first plate 121 includes a top surface 1211, a bottom surface 1212, a front surface 1213 and a rear surface 1214. The top surface 1211 is opposite to the bottom surface 1212. The top surface 1211 and the bottom surface 1212 are connected between the top surface 1211 and the bottom surface 1212. The top surface 1211 is opposite to the top rim 111. The FIG. 3 illustrates the top surface 1211 including an optical structure 1217. The optical structure 1217 includes a number of depressions 1218. The depressions 1218 are connected. The front surface 1213 defines a predetermined pattern 1216. As FIG. 4 illustrates, the predetermined pattern 1216 is formed by a number of pits 1219. In the embodiment, the pits 1219 are arranged to display the word "EXIT."

The light source 30 is fixed to the top rim 111 and opposite to the bottom rim 112. The light source 30 is light emitting diode. When the door 10 is in the closed state, the light source 30 is positioned above the first plate 121, and light emitted from the light source 20 passes through the top surface 1211 to enter the interior of the first plate 212. Then the light enters the front surface 1213. When the light passes through the front surface 1213, the light is scattered at the pits 1219. Thus, the predetermined pattern 1216 is illuminated. When the door 10 is opened, the first plate 121 moves away from the light source 20, and the light is withdrawn from the interior of the first plate 121. Thus, the determined pattern 1216 is not illuminated.

Figure 5:
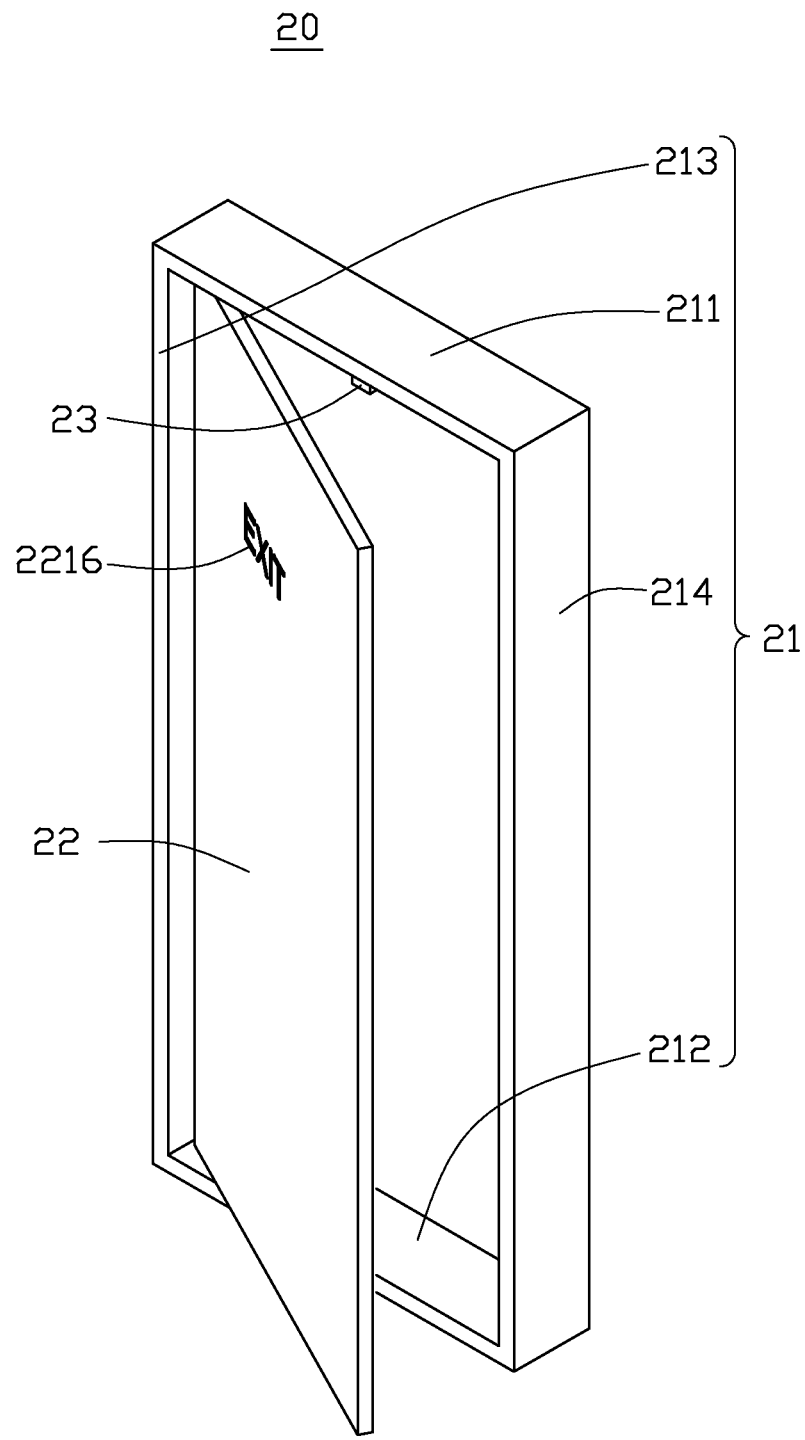
FIG. 5 is an isometric view of a door with an exit signal in an open state, according to another embodiment.

FIG. 5 illustrates a door 20 in another embodiment, similar to the door 10 in FIGS. 1-4. The door frame 21 does not define the first guiding groove 115 and the second guiding groove 116. The door panel 22 only includes the first plate 221. The first plate 221 is rotationally connected to the first lateral rim 213 through a rotation shaft (not shown). The light source 23 is also fixed to the top rim 211 and opposite to the bottom rim 212. When the first plate 221 rotates to touch the second lateral rim 214, the door 20 is in a closed state, and the determined pattern 2216 is illuminated. When the first plate 221 rotates away from the second lateral rim 214, the door 20 is in an opened state, the determined pattern 2216 is not illuminated.

The embodiments shown and described above are only examples. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims.

What is claimed is:

1. A door comprising:
 a door panel comprising a first plate, the first plate comprising a front surface, the front surface defining a plurality of pits forming a predetermined pattern; and
 a light source fixed above the first plate, the light source configured to emit light toward the pits, in event the door is in a closed state, thereby illuminating the predetermined pattern formed by the pits;
 wherein the first plate further comprises a top surface and a bottom surface, the front surface is connected between the top surface and the bottom surface, when the door is in the closed state, the top surface is opposite to the light source.

2. The door as claimed in claim 1, wherein the top surface comprises an optical structure, the light scatters at the optical structure to lighten the predetermined pattern.

3. The door as claimed in claim 2, wherein the optical structure comprises a plurality of depressions, the depressions are connected.

4. A door comprising:
 a door panel comprising a movable first plate, the first plate comprising a front surface, the front surface defining a plurality of pits forming an exit signal; and
 a light source positioned above the first plate, the light source configured to emit light toward the pits, in event the first plate moves to opposite to the light source, thereby illuminating the exit signal formed by the pits;
 wherein the first plate further comprises a top surface and a bottom surface, the front surface is connected between the top surface and the bottom surface; and
 wherein the top surface comprises an optical structure, the light scatters at the optical structure to lighten the predetermined pattern.

5. The door as claimed in claim 4, wherein the optical structure comprises a plurality of depressions, the depressions are connected.

* * * * *